DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 9, 1971

884 O.G. 433

T884,001

MEMBRANE SEPARATION

Robert O. Osborn, Snyder, and Daniel T. Meloon, East Amherst, N.Y., assignors to E. I. du Pont de Nemours and Company, Wilmington, Del.

Continuation of application Ser. No. 659,887, Aug. 11, 1967. This application Dec. 30, 1968, Ser. No. 800,314

Int. Cl. B01d *13/00*

U.S. Cl. 210—23

No Drawing. 11 Pages Specification

A process for separating substances from aqueous mixtures by contacting an aqueous feed mixture with one side of an acrylonitrile polymer gel film membrane under permeation conditions and recovering from the opposite side of the gel film a permeated portion of said aqueous mixture containing a reduced amount of said substances. The gel film can be formed of homopolymer or copolymer of acrylonitrile wherein the acrylonitrile content is at least 75 percent by weight with the remaining portion of the copolymer comprising monomers copolymerizable with acrylonitrile; the polymer should have an intrinsic viscosity of at least 0.5 and the gel film should have a density of from 0.45 to 1.10 grams per cubic centimeter.

This process may be effectively utilized in areas such as dialysis, for example hemodialysis wherein the content of substances such as creatinine, uric acid and urea is reduced in the recovered permeated blood; and ultrafiltration, for example filtration of microorganisms from water wherein such contaminants are removed from the water as it passes through the gel film membrane.